O. P. RENZ.
ADVERTISING DEVICE.
APPLICATION FILED SEPT. 12, 1919.
1,384,568.
Patented July 12, 1921.
2 SHEETS—SHEET 1.
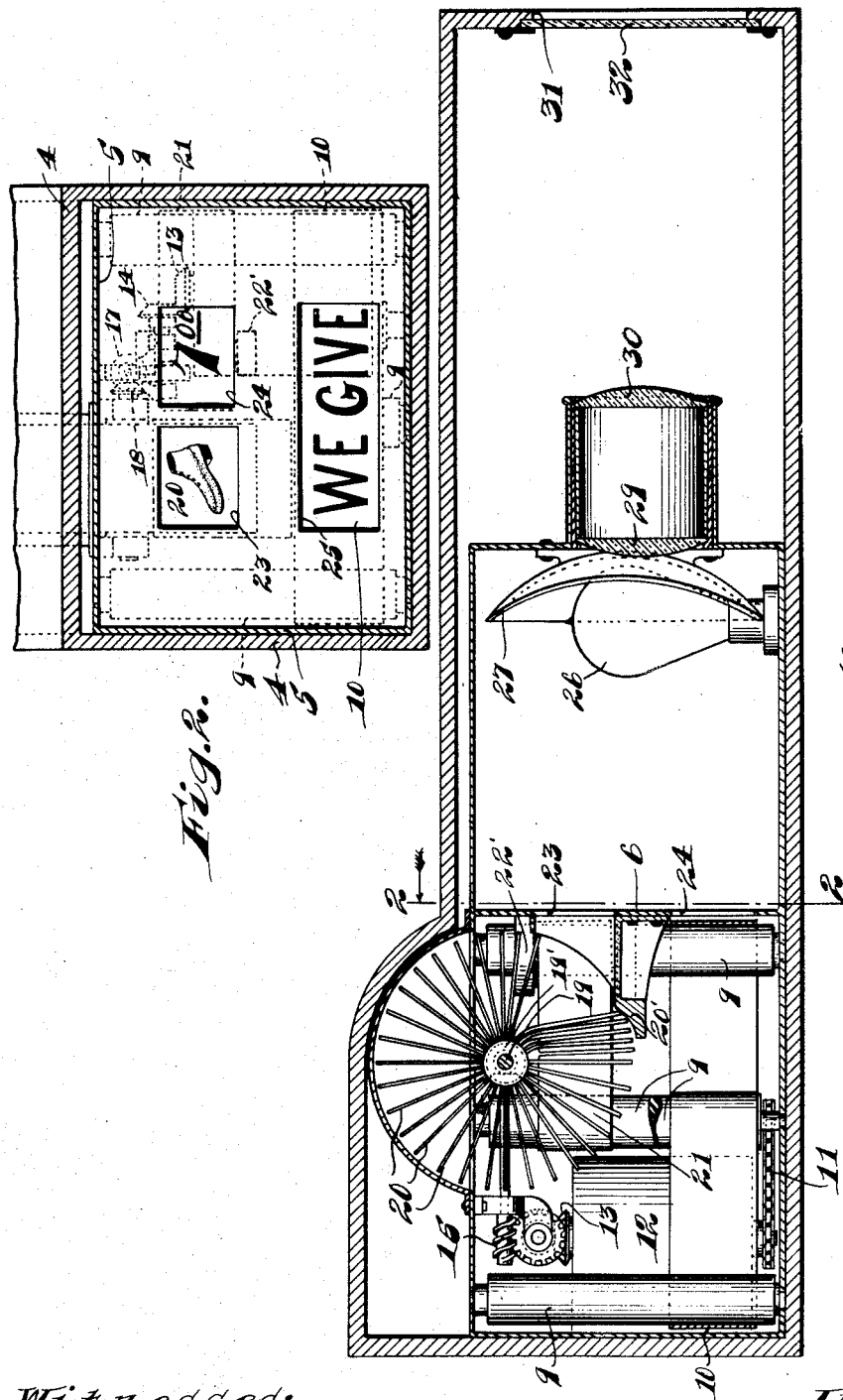

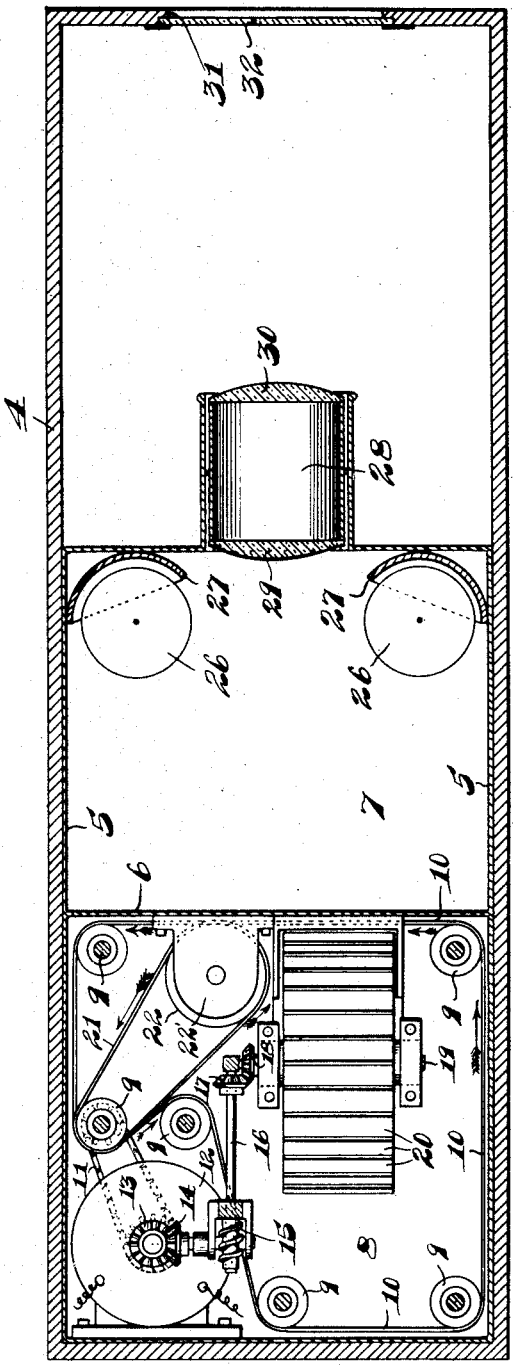

UNITED STATES PATENT OFFICE.

OTTO PAUL RENZ, OF CHICAGO, ILLINOIS.

ADVERTISING DEVICE.

1,384,568.　　　Specification of Letters Patent.　　Patented July 12, 1921.

Application filed September 12, 1919. Serial No. 323,310.

*To all whom it may concern:*

Be it known that I, OTTO PAUL RENZ, a former subject of the Emperor of Germany, (who has declared his intention of becoming a citizen of the United States,) and a resident of the city of Chicago, county of Cook, and State of Illinois, have invented certain new and useful Improvements in Advertising Devices, of which the following is a specification.

My invention relates to new and useful improvements in advertising devices, and has for its object the provision of an advertising device which will be simple in structure, economic of manufacture and highly efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a longitudinal vertical section of my invention.

Fig. 2 is a section taken on substantially line 2—2 of Fig. 1.

Fig. 3 is a top plan view in section of my invention.

The approved form of construction comprises a housing 4, positioned within which is a secondary housing 5 having a transversely extending partition or wall 6 which divides the housing 5 into two separate compartments 7 and 8. Mounted within the compartment 8 are a number of rollers 9 which are engaged by an endless apron or belt 10. Secured to one of the rollers 9 is a cog wheel which is engaged by a belt or sprocket chain 11, which also engages a sprocket wheel secured to one end of the shaft of a motor 12, which is mounted within the compartment 8. Secured to the opposite end of the shaft of the motor 12 is a bevel gear wheel 13 which meshes with a bevel gear 14. This gear 14 is mounted upon one end of a shaft, the opposite end of this shaft having a worm wheel which engages the worm wheel 15. This worm wheel 15 is rigidly mounted to the shaft 16, on one end of which is securely mounted a bevel gear 17. This bevel gear 17 meshes with a gear 18 mounted upon a shaft 19, the shaft 19 being mounted in bearings secured in the compartment 8. Mounted upon the shaft 19, intermediate its bearings, is a hub 19', in which are securely fastened, projecting radially therefrom, a number of leaves 20 which are formed of some flexible resilient material, such as rubber, leather, etc. Securely mounted within the compartment 8 to the partition member 6 are bearings 22' upon which is rotatably mounted a drum or roller 22, this drum or roller 22 being larger than the rollers 9. Passing around the drum 22 and also around the roller 9 upon which the cog wheel is secured, is an endless apron or belt 21.

The device is intended to be used for advertising purposes, and painted or printed or formed in any suitable manner upon the apron 10 is a series of advertisements of various articles, or a series of different advertisements concerning the same article may appear, as will be readily understood. Upon the apron or belt 21 appear a series of labels for cans, thus affording a means for advertising canned goods. Upon the rotation of the member 22, the effect produced upon the observer is of a can rotating having a label fastened thereon. Upon one side of the members 20 appear a series of pictures of successive movements, each member 20 having formed thereon a single picture, and the following member 20, as the drum is rotated, having thereon a single picture of a successive movement of the object which appeared on the preceding picture. The object of this drum with the series of successive pictures of successive movements of some object is to afford a means of showing the manufacture of the goods advertised on the apron 10, or some similar feature relating to the goods. The partition 6 is provided with an opening 23 through which the picture appearing on the member 20 is visible from the compartment 7. As clearly seen in Fig. 1, a member 20' is provided in the compartment 8, which is adapted to engage the members 20 as the hub 19 is rotated, and flex the same backwardly. At the time that the members 20 are flexed backwardly, the picture appearing thereon is clearly visible in the compartment 7 through the opening 23. Upon further rotation of the member 19, the exposed or visible member 20 disengages from the member 20' and, responding to the resiliency of the material of which constructed, flies or moves rapidly upward out of exposed position and leaves the succeeding member 20 in exposed or visible position. An additional opening 24 is provided in the partition member 6, and this opening 24 registers with the portion of the apron 21 which is extended around the member 22. Therefore, through the opening 24 the advertisement on the apron 21 is visible from the compartment 7. Similarly, an opening 25 is provided in the partition 6, which registers with the apron 10, thereby making visible from the compartment 7 the advertising matter appearing upon a portion of the apron 10. In operation, the advertising matter is printed or formed upon the aprons 10 and 21 and the leaves 20. The motor 12 is then set in operation and through the medium of the belt 11 rotates the roller 9 upon which the cog wheel is fastened. This causes the belts 21 and 10 to move in the direction indicated by the arrows, and thereby causing the advertising matter on these belts or aprons which is visible from the compartment 7 to be constantly changing. At the same time the gear wheel 13 sets in operation, through the different coöperating parts, the drum 19, thereby presenting a successive series or successive views of some object in action, and thereby forming a sort of moving picture of the business or enterprise relating to the matter advertised on the apron. Positioned within the housing 7 are illuminating means 26 in the form of incandescent lights, positioned behind which are reflectors 27 so adjusted as to reflect the light from the members 26 upon the openings in the partition 6. Secured to the end wall of the housing 5 is a lens barrel 28 in which are positioned lenses 29 and 30, which are adapted to project the light from the compartment 7 onto a ground glass member or screen 32 which is positioned in an opening 31 provided in the housing 4. From this construction, it is apparent that the light from the members 26, after striking the advertising bearing members, will be reflected and projected by the lens barrel and onto the ground glass 32, thereby presenting on the member 32 an image of the advertising matter which appears on the aprons and on the leaves.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. In an advertising device, the combination of a movable apron; a rotatable drum having a plurality of leaves secured thereto; means of illuminating said apron and said leaves; and means for directing the light reflected from said apron and said leaves onto a screen; and means whereby the rotatable drum and the leaves are actuated to produce a moving object upon said screen, substantially as described.

2. In an advertising device, the combination of a movable apron; a rotatable drum having a plurality of leaves secured thereto; means for rotating said drum and moving said apron simultaneously; means of illuminating said apron and said leaves; means for directing the light reflecting from said apron and said leaves onto a screen; and means whereby the rotatable drum and the leaves are actuated to produce a moving object upon said screen, substantially as described.

3. In an advertising device, the combination of a movable apron; a rotatable drum having a plurality of leaves secured thereto; means of illuminating said apron and said leaves; means whereby objects and letters on said leaves and aprons are reflected on a screen; and means whereby the leaves on the drum are actuated to produce a moving object upon the screen, substantially as described.

4. In an advertising device, the combination of a movable apron; a rotatable drum having a plurality of leaves secured thereto; means for rotating said drum and moving said apron simultaneously; means whereby figures and letters on said leaves and said aprons are reflected on a screen; and means whereby the leaves on the drum are actuated to produce a moving object upon the screen, substantially as described.

5. An advertising device of the class described, comprising a housing; a secondary housing having two compartments; a movable apron mounted in one of said compartments; a rotatable drum having a plurality of leaves mounted thereon, mounted in said compartment; illuminating means mounted in the other of said compartments and adapted to direct light upon said apron and said leaves; means for conveying said light reflected from said apron onto a screen; and means whereby the rotatable drum and leaves are actuated to produce a moving object upon said screen, substantially as described.

6. An advertising device of the class described, comprising a housing; a secondary housing having two compartments; a movable apron mounted in one of said compartments; a rotatable drum having a plurality of leaves mounted thereon, mounted in said compartment; means whereby said apron and said rotatable drum are moved simultaneously; illuminating means mounted in the other of said compartments and adapted to direct light upon said apron and said leaves; means for conveying said light reflected from said apron onto a screen; and means whereby the rotatable drum and leaves are actuated to produce a moving object upon said screen, substantially as described.

In testimony whereof I have signed my name to this specification in the presence of two subscribing witnesses.

OTTO PAUL RENZ.

Witnesses:
 Joshua R. H. Potts,
 Laura J. Erickson.